US011236019B2

(12) United States Patent
Bogyo et al.

(10) Patent No.: US 11,236,019 B2
(45) Date of Patent: Feb. 1, 2022

(54) NATURAL PLANT FIBRE REINFORCED CONCRETE

(71) Applicants: Grant Raymond Bogyo, Penticton (CA); Ronald Fredrick Ryde, Penticton (CA)

(72) Inventors: Grant Raymond Bogyo, Penticton (CA); Ronald Fredrick Ryde, Penticton (CA)

(73) Assignee: NetZero Enterprises Inc., Kelowna (CA)

( * ) Notice: Subject to any disclaimer, the term of this patent is extended or adjusted under 35 U.S.C. 154(b) by 396 days.

(21) Appl. No.: 16/173,983

(22) Filed: Oct. 29, 2018

(65) Prior Publication Data

US 2019/0127274 A1 May 2, 2019

Related U.S. Application Data

(60) Provisional application No. 62/578,106, filed on Oct. 27, 2017.

(51) Int. Cl.
| | |
|---|---|
| *C04B 18/02* | (2006.01) |
| *C04B 18/24* | (2006.01) |
| *C04B 16/12* | (2006.01) |
| *C04B 20/10* | (2006.01) |
| *C04B 28/02* | (2006.01) |

(Continued)

(52) U.S. Cl.
CPC ............ *C04B 18/022* (2013.01); *C04B 16/12* (2013.01); *C04B 18/248* (2013.01); *C04B 20/1066* (2013.01); *C04B 20/1074* (2013.01); *C04B 20/1077* (2013.01); *C04B 28/02* (2013.01); *E04C 5/07* (2013.01); *D01B 1/00* (2013.01)

(58) Field of Classification Search
None
See application file for complete search history.

(56) References Cited

U.S. PATENT DOCUMENTS

| 5,876,649 A * | 3/1999 | Ryan | B29C 70/48 |
|---|---|---|---|
| | | | 264/136 |
| 2015/0105499 A1 * | 4/2015 | Yano | C08L 1/10 |
| | | | 524/37 |

FOREIGN PATENT DOCUMENTS

| CN | 101914860 | 8/2012 |
|---|---|---|
| CN | 104210311 | 12/2014 |

(Continued)

OTHER PUBLICATIONS

Machine translation of DE102016102194 (Year: 2017).*

(Continued)

*Primary Examiner* — Shawn Mckinnon
(74) *Attorney, Agent, or Firm* — Richard D. Okimaw

(57) ABSTRACT

A composite material and process for forming composite material. The composite material comprises a quantity of plastinated plant distributed within a matrix material. The process comprises separating a plant material into plant fibers plastinating the plant fibers and combining the plastinated plant fibers with a matrix material. The plant fibers may be selected form the group consisting of bamboo, hemp and flax. The plant fibers may be formed by crushing a portion of a plant. The matrix material may comprise Polyethylene Terephthalate (PET). The PET may be shredded and heated. The heated composite material may be formed into rebar and be arranged in a pattern within a concrete slurry.

9 Claims, 4 Drawing Sheets

(51) Int. Cl.
    *E04C 5/07* (2006.01)
    *D01B 1/00* (2006.01)

(56) References Cited

FOREIGN PATENT DOCUMENTS

| | | | |
|---|---|---|---|
| CN | 103522511 | | 2/2016 |
| DE | 102016102194 | * | 8/2017 |

OTHER PUBLICATIONS

International Searching Authority, The International Search Report and the Written Opinion of the International Searching Authority, or the Declaration, International Application No. PCT/CA2018/051370, Filed Oct. 29, 2019, 8 pages, Receiving Office—Canadian Intellectual Property Office.

* cited by examiner

NATURAL PLANT FIBRE REINFORCED CONCRETE

CROSS REFERENCE TO RELATED APPLICATION

This application claims priority to U.S. Provisional Patent Application No. 62/578,106 filed Oct. 27, 2017 entitled Natural Plant Fibre Reinforced Concrete.

BACKGROUND OF THE INVENTION

1. Field of Invention

The present invention relates generally to reinforcing bar (rebar) for concrete and more particularly to rebar formed using a plastinated natural plant fiber.

2. Description of Related Art

Concrete is a composite material used extensively in construction. Aggregate is mixed with a fluid cement to form a concrete slurry which may be poured or molded into a desired shape then hardens over time. On its own, concrete has high compressive strength but low tensile strength properties. As such, concrete is typically reinforced with materials having high tensile strength properties to produce a reinforced composite material that has both high compressive and tensile strength properties.

Traditionally, steel rebar is used to reinforce concrete. Other methods of tensile reinforcement include, but are not limited to, steel fibers, glass fibers or plastic fibers. A disadvantage of steel products is that they are subject to corrosion over time. Additionally, these reinforcement products may be difficult or cost prohibitive to source in some markets.

Some natural materials have been tested as reinforcement materials within concrete. Examples of such materials include plant fibers such as bamboo, hemp and other poly plastic fibers. A disadvantage of using bamboo and other natural plant products is that there is a concern for water absorption into the plant material. With increased water content, the plant can expand causing cracks and voids within the concrete. Dried plant fibers tend to absorb moisture from the concrete, creating a void which defeats the purpose of the reinforcing material. Additionally, an untreated natural plant can deteriorate over time due to moisture, mold and insect activity. Current treatments in curing bamboo and other plant fibers do not overcome all concerns, such as maintaining physical and chemical properties of the bamboo or other fiber.

SUMMARY OF THE INVENTION

According to a first embodiment of the present invention there is disclosed a process for forming a composite material comprising separating a plant material into plant fibers plastinating the plant fibers and combining the plastinated plant fibers with a matrix material.

The plant fibers may be selected form the group consisting of bamboo, hemp and flax. The plant fibers may be formed by crushing a portion of a plant.

The matrix material may comprise Polyethylene Terephthalate (PET). The PET may be shredded and heated.

The heated composite material may be formed into the elongate rods with an extruder. The elongate rods may be formed with a surface texture thereon.

The elongate rods may be coated with at least one of recycled concrete, sand or lime to improve adherence of the elongate rods to a concrete slurry. The elongate rods may be arranged in a pattern within a concrete slurry.

According to a further embodiment of the present invention there is disclosed a composite material comprising a quantity of plastinated plant distributed within a matrix material.

The plant fibers may be selected form the group consisting of bamboo, hemp and flax. The plant fibers may be formed by crushing a portion of a plant.

The matrix material may comprise Polyethylene Terephthalate (PET). The PET may be shredded and heated.

The heated composite material may be formed into the elongate rods with an extruder. The elongate rods may be formed with a surface texture thereon. The elongate rods may be coated with at least one of recycled concrete, sand or lime to improve adherence of said elongate rods to a concrete slurry. The elongate rods may be arranged in a pattern within a concrete slurry.

BRIEF DESCRIPTION OF THE DRAWINGS

In drawings which illustrate embodiments of the invention wherein similar characters of reference denote corresponding parts in each view.

DETAILED DESCRIPTION

The present invention provides a process for forming a reinforced bar (rebar) with plastinated natural plant fibers for use in concrete. According to a first embodiment of the present invention, plant fibers are plastinated by means as are commonly known, then the plastinated fibrers are combined with a plastic matrix and extruded to form elongate rods to be used as rebar within concrete, as is commonly known. Optionally, the plastinated fibers may be located within a concrete slurry to form a fiber-reinforced concrete mixture, increasing the structural integrity of the concrete.

Figure 1:
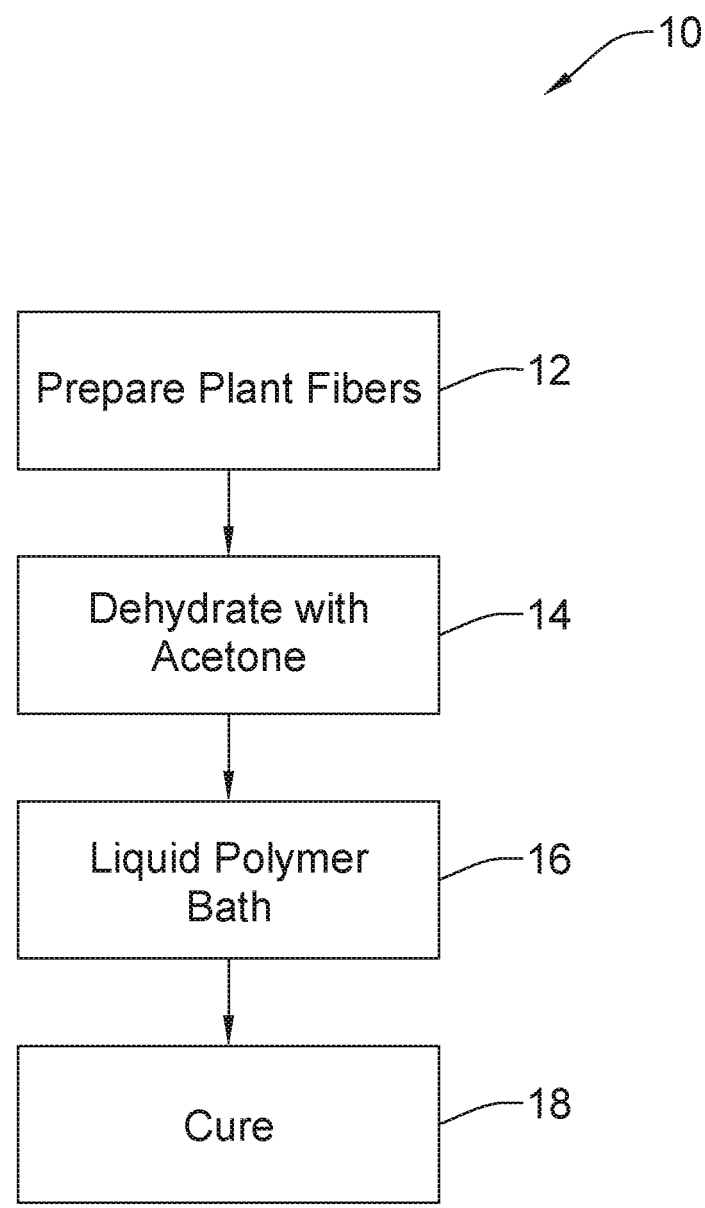
FIG. 1 is a flow chart depicting a process for plastinating natural plant fibers.

Referring to FIG. 1, a process for plastinating natural plant fibers is illustrated generally at 10. Various plastination processes are commonly known, and described herein is one exemplary method. It will be appreciated that other plastination methods and techniques may also be useful as well. The plant fibers may be selected from a desired plant species, such as, by way of non-limiting example, bamboo, hemp and flax, although other plant species may be useful, as well. In particular, the bamboo species "*Guadua angustifolia*", has been found to have a higher tensile strength and may be particularly useful for the present methods.

The plant is harvested and prepared for plastination in step 12. The plant is dried, crushed and cut to prepare it into individual fibers or groups of fibres at this stage, although it will be appreciated that the plant may be crushed or cut into individual fibres following the plastination process, as well, such as, by way of non-limiting example, chipping shredding or the like. The plant fibers are immersed in a 100% acetone bath in step 14, which is brought to a temperature of between −13 and 77 degrees Fahrenheit (−25 and 25 degrees Celsius) at which point the acetone replaces the water within the plant cells, thus dehydrating the plant material and eliminating moisture and mold concerns. In particular, it has been found that room temperature, such as, by way of non-limiting example, between 59 and 77 degrees Fahrenheit (15 and 25 degrees Celsius has been useful. The plant fibers remain in the acetone bath until they are saturated with acetone. Following dehydration, the dehydrated plant material is immersed in a liquid polymer bath in step 16. The liquid polymer bath may be formed of such as, by way of non-limiting example, silicone polymer (such a mixture of Biodur S10 and Biodur S3), polyester or epoxy resin, although other liquid polymers may be useful, as well. In particular, it has been found that a mixture of 100 parts S10 to 1 part S3 has been useful. The liquid polymer bath with the dehydrated plant material therein may be placed under vacuum, which vaporizes the acetone in the cells and draws the liquid polymer therein to replace the acetone. Step 16 continues until surface bubbles stop forming, at which point the vacuum is released and Biodur S6 is sprayed onto the fibers. Finally, in step 18 the plant material is removed from the liquid polymer bath and the liquid polymer within the cells may be cured to a hardened state. The curing process may include such as, by way of non-limiting example, drying at room temperature or applying heat, gas or ultraviolet light.

At this stage, the plastinated fibers 54 may be combined with a concrete slurry to produce a fiber-reinforced concrete product. Concrete with fibrous material therein has been shown to have improved structural integrity, helping to control cracking and providing greater impact, abrasion and shatter-resistance. As the water content of the plant fibers has been replaced by a liquid polymer, the fibers will not decay, attract insects or expand due to moisture absorption. Such fibers may be utilized within a matrix of another material, such as by way of non limiting example plastics or concrete as described herein and may also be utilized as a non decaying fiber which may be used in place of any other commonly known fibers. In particular it will be appreciated that such plastinated fibers may be stronger than the unplastinated fibers as well as being resistant to moisture, mildew and rot due to near 0% moisture in such plastinated fibers. Such fibers may also be less subject to deterioration when exposed to ultra violet light. By way of non-limiting example such plastinated fibers may be useful as a substitute for organic or inorganic fibers in composite material. It will also be appreciated the whole plant or any portion thereof such as, by way of non-limiting example, dimensioned lumber may be plastinated in the above manner to provide the above advantages. It has also been found that including plastinated fibers within other composite materials such as fiberglass may provide improved impact and noise dampening properties.

Figure 2:
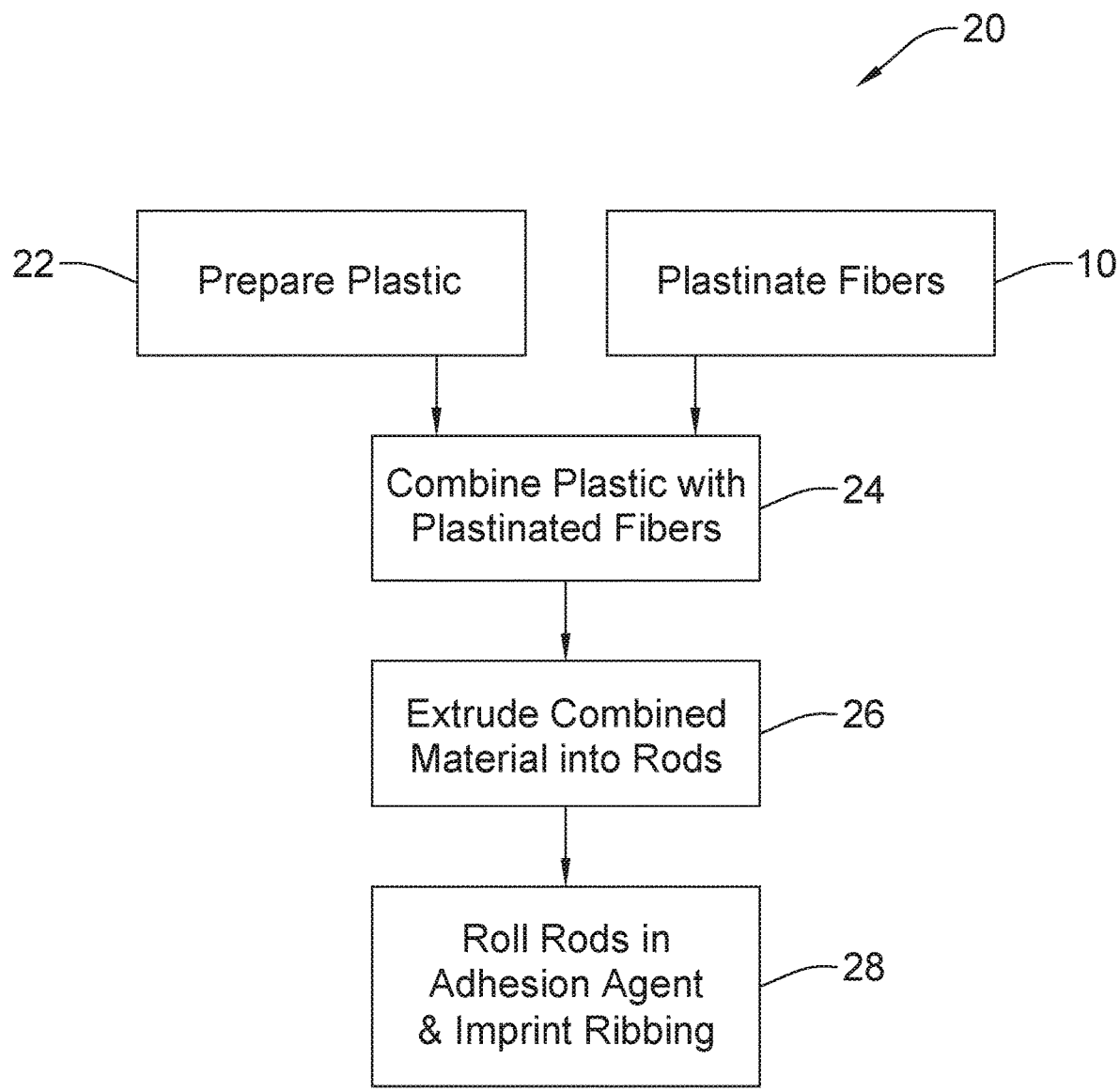
FIG. 2 is a flow chart depicting a process for preparing elongate rods with palatinate natural plant fibers according to a first embodiment of the present invention.
Figure 4:
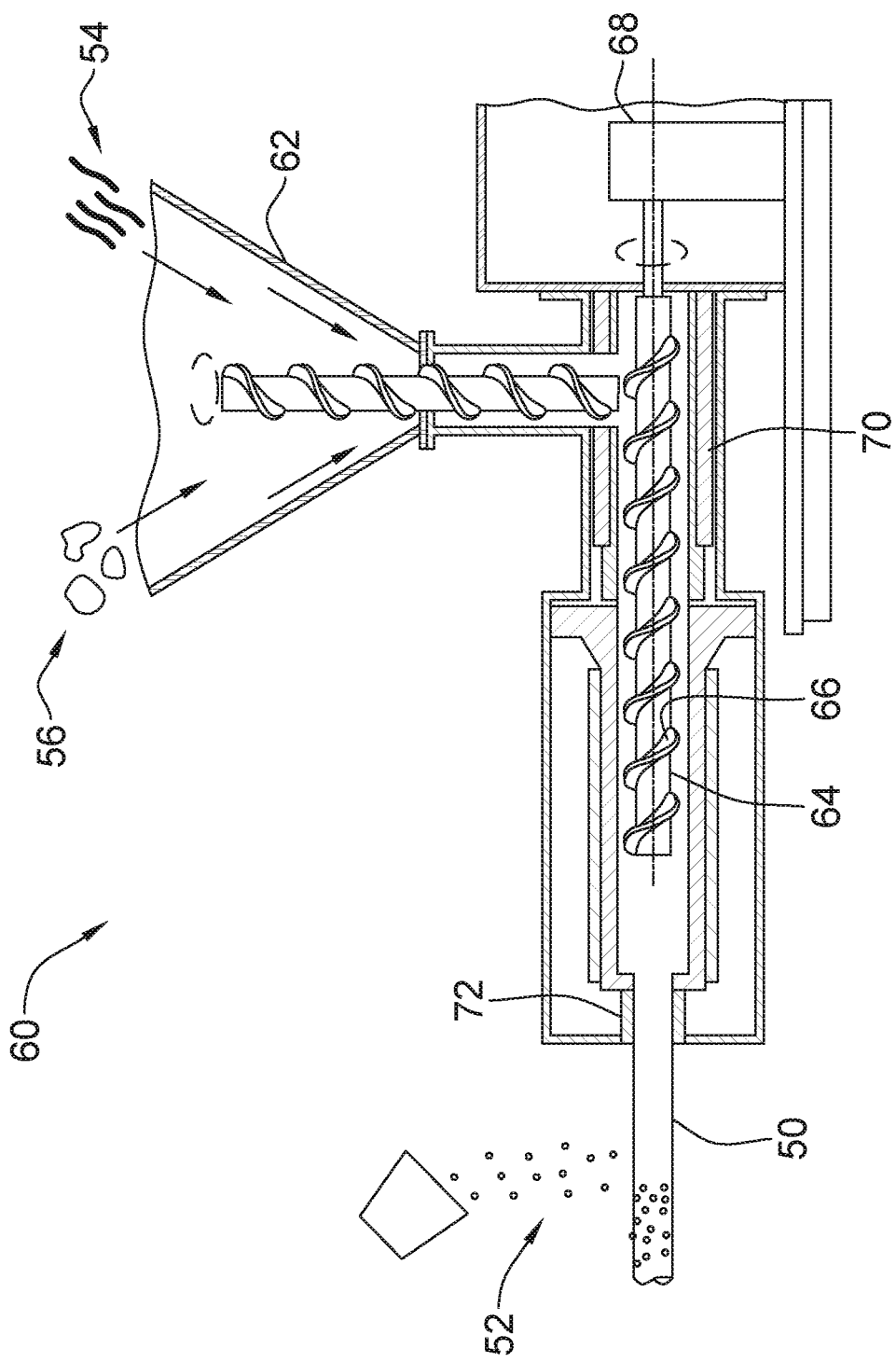
FIG. 4 is a cross sectional view of an apparatus for extruding the elongate rods with plastinated natural plant fibers in accordance with the method of FIG. 2.

Turning now to FIG. 2, a process for preparing plastinated plant fiber rods is illustrated generally at 20. Plastic material 56 such as, by way of non-limiting example, Polyethylene Terephthalate (PET) plastic, such as from reclaimed water, soda and juice bottles, is washed and shredded in step 22. The washing and shredding process may be performed on site or locally available PET plastic facilities may be used, providing local employment and an incentive for environmental reclamation by removal of discarded PET plastic. The PET plastic material 56 may be shredded by any known means, such as, by way of non-limiting example, through a shredder, grinder, wood chipper, pelletizer or the like. The plastinated fibers prepared in the process 10 are then combined with the prepared PET plastic in step 24 and fed into an extrusion machine as illustrated in FIG. 4 and further described below. The combined material is brought to a temperature in the range of such as, by way of non-limiting example, 475 to 536 degrees Fahrenheit (246 to 280 degrees Celsius) and extruded into elongate rods 50 in step 26. The combined material is kept within this temperature range for up to 20 seconds prior to being extruded. Upon exit from the extrusion machine, while the elongate rods 50 are at an elevated temperature in the range such as, by way of non-limiting example, 86 to 275 Fahrenheit (30 to 135 Celsius), they may have adhesion agent 52 applied thereto while a ribbing surface texture is imprinted thereon in step 28. The adhesion agent 52 may be such as, by way of non-limiting example, lime, recycled concrete or sand, although other adhesion agents may be useful as well. The combination of a ribbed surface, as is commonly known, and the embedded adhesion agent improves adhesion to concrete over conventional methods.

Figure 3:
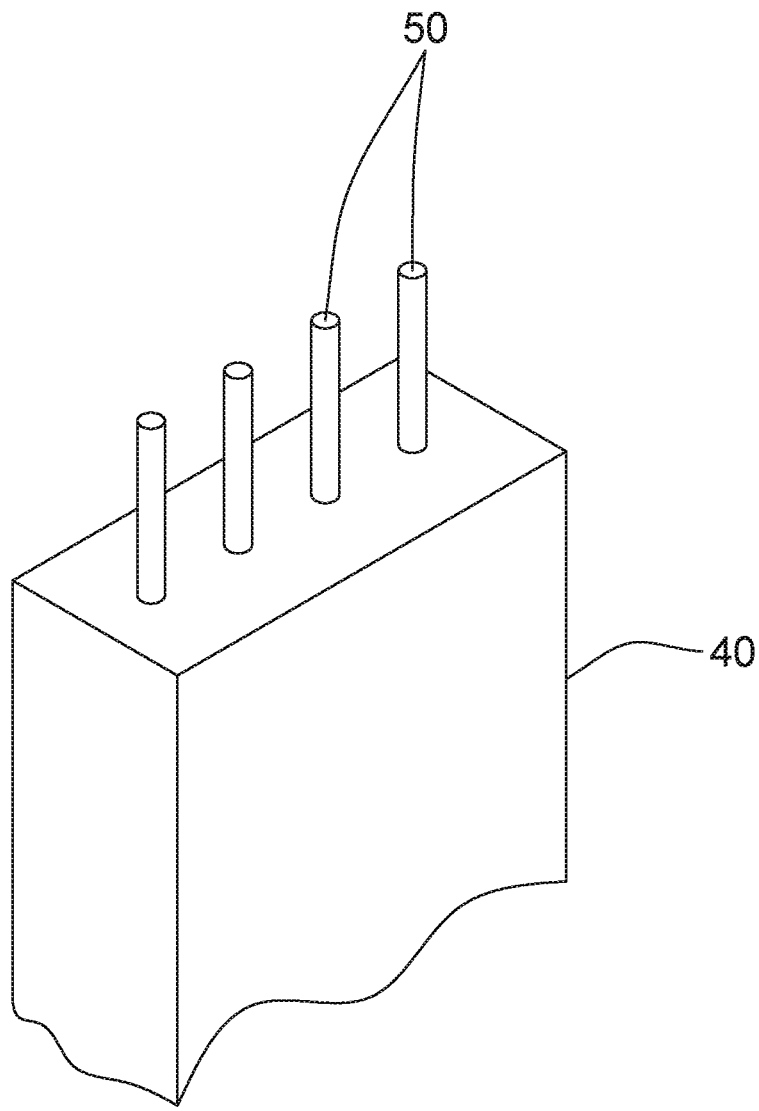
FIG. 3 is a perspective view of a composite concrete body having elongate rods formed of plastinated natural plant fibers therein.

The prepared elongate rods 50 may now be used for concrete reinforcement in the same manner as typical rebar is used, as is commonly known as illustrated in FIG. 3 by embedding within or otherwise forming a concrete structure 40 therearound according to known methods.

Turning now to FIG. 4, an exemplary extrusion apparatus is illustrated generally at 60. The extrusion apparatus includes a hopper 62 adapted to receive the plastinated natural plant fibres 54 and PET plastic material 56. The extrusion apparatus 60 may include an auger 64 having a spiralled driving surface or fin 66 extending therefrom such that rotation of the auger 64 by a motor 68 will move the plastinated natural plant fibres 54 and PET plastic material 56 along the extrusion housing towards and through an extrusion die 72. A heater 70 may be provided to increase the temperature of the combined plastinated natural plant fibres 54 and PET plastic material 56 to the desired temperature. Upon exit from the extrusion apparatus 60, the elongate rod 50 may have an adhesion agent 52 applied thereto, as described above. It will be appreciated that although a single screw style extrusion machine is illustrated, any other suitable extrusion machine may also be useful such as, by way of non-limiting example, a twin screw design. It will be appreciated that the hopper 62 may receive PET plastic material 56 without the addition of plastinated natural fibres 54 to form an elongate rod 50 which does not include plastinated natural fibres 54 therein, or the hopper may receive PET plastic material 56 with the addition of alternate fibrous material, such as, by way of non-limiting example, glass, carbon, aramid or boron fibers.

While specific embodiments of the invention have been described and illustrated, such embodiments should be considered illustrative of the invention only and not as limiting the invention as construed in accordance with the accompanying claims.

What is claimed is:

1. A process for forming a composite material comprising:
separating a plant material into plant fibers;
plastinating said plant fibers by:
saturating said plant fibers in acetone to dehydrate said plant fibres;
immersing said dehydrated plant fibres in a liquid polymer; and
subjecting said immersed plant fibres to a vacuum to replace acetone in said plant fibers with said liquid polymer; and combining said plastinated plant fibers with a matrix material.

2. The process of claim 1 wherein said plant fibers are selected form the group consisting of bamboo, hemp and flax.

3. The process of claim 1 wherein said plant fibers are formed by crushing a portion of a plant.

4. The process of claim 1 wherein said matrix material comprises plastic.

5. The process of claim 4 wherein said matrix material is shredded and heated.

6. The process of claim 5 wherein said heated composite material is formed into elongate rods with an extruder.

7. The process of claim 6 wherein said elongate rods are formed with a surface texture thereon.

8. The process of claim 1 wherein said elongate rods are coated with at least one of recycled concrete, sand or lime to improve adherence of said elongate rods to a concrete slurry.

9. The process of claim 1 wherein said elongate rods are arranged in a pattern within a concrete slurry.

\* \* \* \* \*